United States Patent
Ohshima

(10) Patent No.: US 12,047,542 B2
(45) Date of Patent: Jul. 23, 2024

(54) IMAGE DATA TRANSFER CONTROL DEVICE AND IMAGE DATA TRANSFER CONTROL METHOD

(71) Applicant: TOSHIBA TEC KABUSHIKI KAISHA, Tokyo (JP)

(72) Inventor: Masami Ohshima, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 17/552,957

(22) Filed: Dec. 16, 2021

(65) Prior Publication Data

US 2022/0109774 A1 Apr. 7, 2022

Related U.S. Application Data

(63) Continuation of application No. 16/830,097, filed on Mar. 25, 2020, now Pat. No. 11,240,396.

(51) Int. Cl.
| | |
|---|---|
| *H04N 1/04* | (2006.01) |
| *H04N 1/024* | (2006.01) |
| *H04N 1/028* | (2006.01) |
| *H04N 1/047* | (2006.01) |

(52) U.S. Cl.
CPC ....... *H04N 1/02481* (2013.01); *H04N 1/0249* (2013.01); *H04N 1/02865* (2013.01); *H04N 1/047* (2013.01)

(58) Field of Classification Search
USPC ................................ 358/3.26, 1.17
See application file for complete search history.

(56) References Cited

U.S. PATENT DOCUMENTS

| | | | |
|---|---|---|---|
| 6,119,334 A | 9/2000 | Watanabe et al. | |
| 6,816,634 B2 | 11/2004 | Hirawa | |
| 8,184,342 B2 | 5/2012 | Hirosawa et al. | |
| 2004/0224102 A1* | 11/2004 | Ebihara ............... | H04N 1/0473 428/32.1 |
| 2009/0141293 A1 | 6/2009 | Fujimoto | |
| 2009/0195580 A1 | 8/2009 | Miyamoto | |

FOREIGN PATENT DOCUMENTS

JP 2002-200786 A 7/2002

OTHER PUBLICATIONS

U.S. Notice of Allowance on U.S. Appl. No. 16/830,097 DTD Sep. 17, 2021.

* cited by examiner

*Primary Examiner* — Cheukfan Lee
(74) *Attorney, Agent, or Firm* — FOLEY & LARDNER LLP

(57) ABSTRACT

An image data transfer control device includes a first interface, a first and a second memory, a processor, and a second interface. The first interface acquires image data transferred in predetermined units. The first memory stores inclination correction data corresponding to the inclination of a print head, and correction position data indicating a correction position included in at least one divided image line among the predetermined number of divided image lines including each divided image line group. The second memory stores correction target image data at the correction position. The processor selects each divided image line group based on the inclination correction data, and specifies first and second correction target image data. The second interface outputs the second divided image line group including the first correction target image data instead of the second correction target image data.

20 Claims, 5 Drawing Sheets

IMAGE DATA TRANSFER
IMAGE DATA TRANSFER CONTROL DEVICE AND IMAGE DATA TRANSFER CONTROL METHOD

CROSS-REFERENCE TO RELATED APPLICATION

This application is a continuation of U.S. application Ser. No. 16/830,097 filed Mar. 25, 2020, the entire contents of which are incorporated herein by reference.

FIELD

Embodiments described herein relate generally to an image data transfer control device and an image data transfer control method.

BACKGROUND

An electrophotographic printer (hereinafter, referred to as a printer) equipped with a print head is widely used. For example, the print head includes a plurality of light emitting elements such as Light Emitting Diodes (LEDs) or Organic Light Emitting Diodes (OLEDs). The photosensitive drum is exposed by the light output from the plurality of light emitting elements, a latent image is formed on the photosensitive drum, and an image corresponding to the latent image is printed.

DETAILED DESCRIPTION

Figure 1:
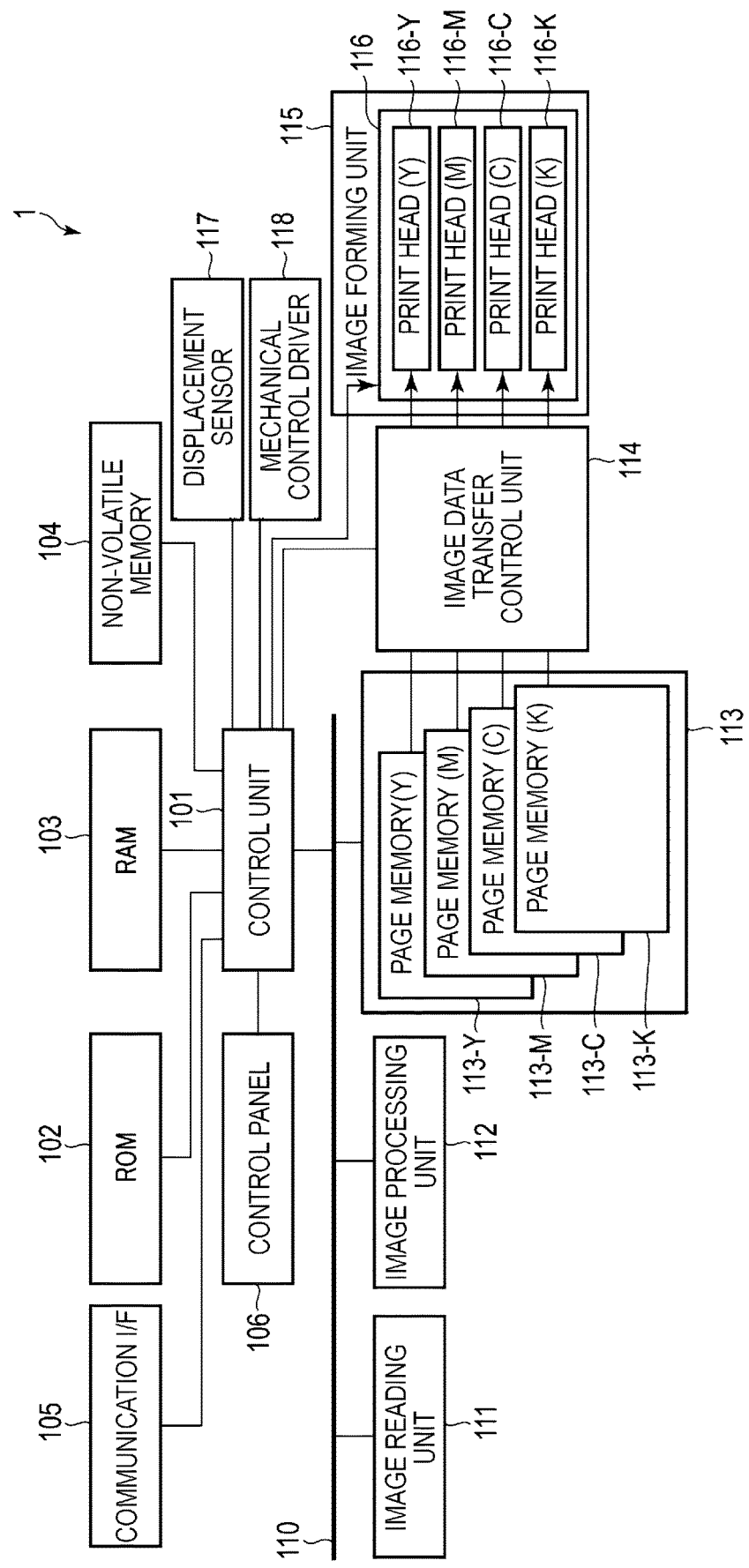
FIG. 1 is a block diagram illustrating an example of a schematic configuration of an image forming apparatus according to an embodiment.

In some printers, a print head is provided with light emitting elements corresponding to 15400 pixels, arrangement of the light emitting elements corresponds to a main scanning direction, and back and forth movement of the print head corresponds to a sub-scanning direction. The print head is attached to a housing by highly precise positioning, but may be slightly inclined with respect to the arrangement of tens of thousands of pixels. The influence of such an inclination of the print head is reduced to such an extent that the influence cannot be visually discriminated by the inclination correction of the image data.

For example, from the image data stored in an external memory, the image data for a plurality of lines is temporarily read into an internal memory, and the image data for one line corresponding to the inclination correction amount indicating the inclination of the print head is read from the image data for the plurality of lines read into the internal memory. Alternatively, when reading the image data stored in the external memory, the image data for one line corresponding to the inclination correction amount is read. As described above, by reading the image data using the inclination correction amount, the influence of the shift in the sub-scanning direction due to the inclination of the print head is suppressed.

In general, according to at least one embodiment, the image data transfer control device includes a first interface, a first memory, a second memory, a processor, and a second interface. The first interface acquires image data transferred in predetermined units. The first memory stores inclination correction data corresponding to the inclination of a print head that prints an image based on the image data constituted of a plurality of divided image lines, and correction position data indicating a correction position included in at least one divided image line among the predetermined number of divided image lines constituting each divided image line group. The second memory stores correction target image data at the correction position. The processor selects each divided image line group based on the inclination correction data, and specifies, based on the correction position data, first correction target image data included in a first divided image line group and second correction target image data included in a second divided image line group. The second interface outputs the second divided image line group including the first correction target image data instead of the second correction target image data to the print head.

Hereinafter, an example of an image forming apparatus including an image data transfer control device according to one or more embodiments will be described with reference to the drawings. In the respective drawings, the same components are denoted by the same reference numerals.

FIG. 1 is a block diagram illustrating an example of a schematic configuration of the image forming apparatus according to an embodiment. In the present embodiment, an image forming apparatus of a color printer will be described, but an image forming apparatus of a monochrome printer may be used.

For example, an image forming apparatus 1 is a Multi-Function Peripheral (MFP). As illustrated in FIG. 1, the image forming apparatus 1 includes a control unit (controller) 101, a Read Only Memory (ROM) 102, a Random Access Memory (RAM) 103, a nonvolatile memory 104, a communication interface (I/F) 105, a control panel 106, an image data bus 110, an image reading unit (reader) 111, an image processing unit (processor) 112, a page memory 113, an image data transfer control unit (data transfer controller) 114, an image forming unit (image former) 115, a print head 116, a displacement sensor 117, a mechanical control driver 118, and the like. The image data transfer control unit 114 corresponds to an image data transfer control device, and this image data transfer control device executes an image data transfer control method. The control unit 101 is connected with the ROM 102, the RAM 103, the nonvolatile memory 104, the communication I/F 105, the control panel 106, the image data transfer control unit 114, the displacement sensor 117, the mechanical control driver 118, and the like. The control unit 101 includes one or more processors, and the processor is a Central Processing Unit (CPU), a Micro Processing Unit (MPU), a Digital Signal Processor (DSP), or a combination thereof. The control unit 101 controls operations such as image reading, image processing, and image formation in accordance with various programs stored in at least one of the ROM 102 and the nonvolatile memory 104. The control unit 101 also controls operations such as image data transfer and print head light emission in accordance with various programs stored in at least one of the ROM 102 or the nonvolatile memory 104.

The ROM 102 is a non-transitory computer-readable storage medium functioning as a program memory and stores various programs. The RAM 103 functions as a work memory, temporarily stores a program read from the ROM 102 and temporarily stores data handled by the program. The nonvolatile memory 104 is a non-transitory computer-readable storage medium and stores various programs. The nonvolatile memory 104 temporarily stores a program read from the ROM 102 and temporarily stores data handled by the program. Further, the nonvolatile memory 104 stores inclination correction data corresponding to the inclination of the print head 116 with respect to the regular mounting position. Further, the nonvolatile memory 104 stores correction position data indicating correction positions included in a plurality of divided image lines constituting image data. The correction position data indicates a correction position included in at least one divided image line among the predetermined number of divided image lines constituting each divided image line group. The role of the inclination correction data and the correction position data will be described later in detail.

The communication I/F 105 outputs various information to the outside and inputs various information from the outside. Further, the communication I/F 105 acquires image data. The control panel 106 includes an input unit such as a touch panel and a display unit such as a display, and receives operation inputs from a user and a service person.

The control unit 101, the image reading unit 111, the image processing unit 112, and the page memory 113 are connected to the image data bus 110, and the image data bus 110 transfers image data between the control unit 101, the image reading unit 111, the image processing unit 112, and the page memory 113.

The image reading unit 111 optically reads a document image, acquires image data corresponding to the document image, and outputs the acquired image data to the image processing unit 112. The image processing unit 112 performs various image processing such as correction on image data acquired via the communication I/F 105 or image data acquired by the image reading unit 111. The page memory 113 includes page memories 113-Y (Yellow), 113-M (Magenta), 113-C (Cyan), and 113-K (Key plate). The page memories 113-Y, 113-M, 113-C, and 113-K store the image data of respective colors processed by the image processing unit 112.

An image data transfer control unit 114 is connected to the page memories 113-Y, 113-M, 113-C, and 113-K. The image data transfer control unit 114 transfers the image data of each color output from each of the page memories 113-Y, 113-M, 113-C, and 113-K to the image forming unit 115. The image forming unit 115 includes the print head 116 and the like, and the print head 116 includes print heads 116-Y, 116-M, 116-C, and 116-K. The image data (Y) output from the page memory 113-Y is transferred to the print head 116-Y, and the image data (M) output from the page memory 113-M is transferred to the print head 116-M; the image data (C) output from the page memory 113-C is transferred to the print head 116-C; and the image data (K) output from the page memory 113-K is transferred to the print head 116-K.

For example, the control unit 101 edits the image data on the page memories 113-Y, 113-M, 113-C, and 113-K in accordance with the print position. Further, the control unit 101 may edit the image data on the page memories 113-Y, 113-M, 113-C, and 113-K in accordance with the print head.

The image forming unit 115 forms an image based on the image data transferred from the page memories 113-Y, 113-M, 113-C, and 113-K to the print heads 116-Y, 116-M, 116-C, and 116-K. That is, the image forming unit 115 forms an image corresponding to the light emission (states of light emission and light off) of the light emitting element of the print head 116 based on the image data.

Further, the control unit 101 inputs the image data of the test pattern into the page memories 113-Y, 113-M, 113-C, and 113-K, and the image forming unit 115 forms the test pattern. The displacement sensor 117 detects the test pattern formed on the transfer belt 103 and outputs a detection signal to the control unit 101. The control unit 101 recognizes the positional relationship between the test patterns of each color from the input of the displacement sensor 117 and generates shift correction data. Further, the control unit 101 detects the inclination (the amount of inclination) of the print head 116 with respect to the regular mounting position from the input of the displacement sensor 117 and generates inclination correction data corresponding to the inclination. Further, the control unit 101 generates correction position data indicating a correction position included in a divided image line constituting the image data based on the inclination correction data. The nonvolatile memory 104 stores the shift correction data, the inclination correction data, and the correction position data. The image forming unit 115 prints the test pattern on the recording paper, the image reading unit 111 reads the test pattern from the recording paper, and the control unit 101 may generate the shift correction data, the inclination correction data and the position correction data based on the test pattern reading result. The control unit 101 controls the color shift correction, the inclination correction, and the position correction based on the shift correction data, the inclination correction data, and the position correction data.

The mechanical control driver 118 controls operations of a motor and the like necessary at the time of printing according to an instruction from the control unit 101. The control unit 101 outputs a selection signal for selecting one sheet cassette from a plurality of sheet cassettes through the mechanical control driver 118 based on the information of the sheet cassette designated from the control panel 106 and the information of the loaded sheet cassette provided from the mechanical control driver 118. The mechanical control driver 118 selects one sheet cassette from the plurality of sheet cassettes according to the selection signal from the control unit 101.

Figure 2:
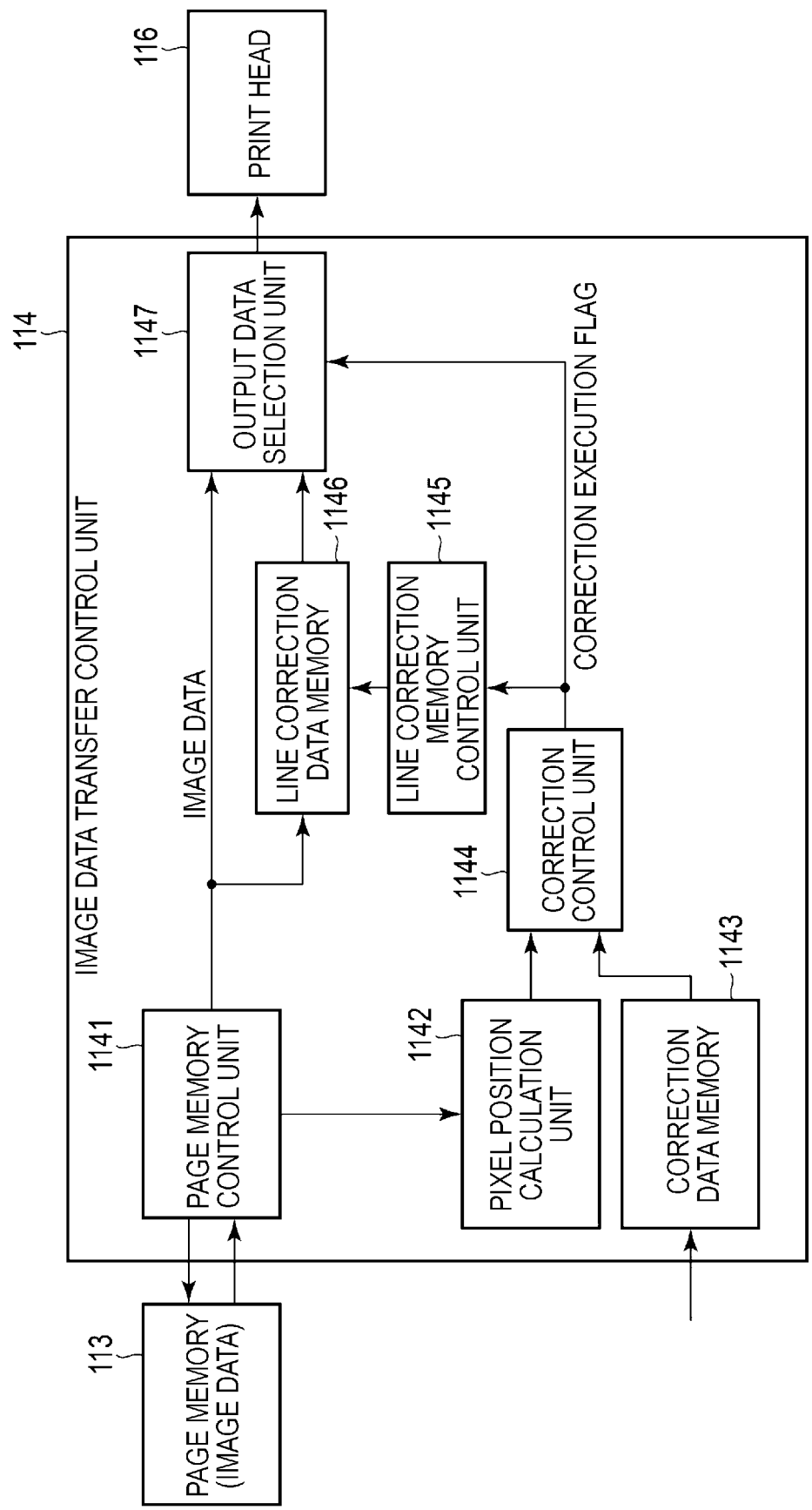
FIG. 2 is a block diagram illustrating a schematic configuration of an image data transfer controller.

FIG. 2 is a block diagram illustrating a schematic configuration of the image data transfer control unit of the image forming apparatus according to the embodiment.

As illustrated in FIG. 2, the image data transfer control unit 114 includes a page memory control unit 1141, a pixel position calculation unit 1142, a correction data memory 1143, a correction control unit 1144, a line correction memory control unit 1145, and a line correction data memory 1146, and an output data selection unit 1147.

The page memory control unit 1141 is a first interface that acquires image data transferred from the page memory 113 in predetermined units. Image data corresponding to the document image is constituted of a plurality of image lines. Each of the image lines is constituted of a plurality of divided image lines. One divided image line is the minimum data transfer unit. The pixel position calculation unit 1142 calculates (or otherwise determines) the position of each pixel included in the acquired image data. The correction data memory 1143 is a first memory and stores the inclination correction data and the correction position data transferred from the nonvolatile memory 104. The correction control unit 1144 includes one or more processors, corrects an image line based on the inclination correction data, and replaces image data at a correction position included in the divided image line based on the correction position data. The line correction memory control unit 1145 includes one or more processors and controls the output of data stored in the line correction data memory 1146. The correction control unit 1144 and the line correction memory control unit 1145 may be configured by one control unit. The line correction data memory 1146 is a second memory and stores correction target data at the correction position included in the divided image line. The output data selection unit 1147 is a second interface that outputs image data to the print head 116 in predetermined units.

Figure 3:
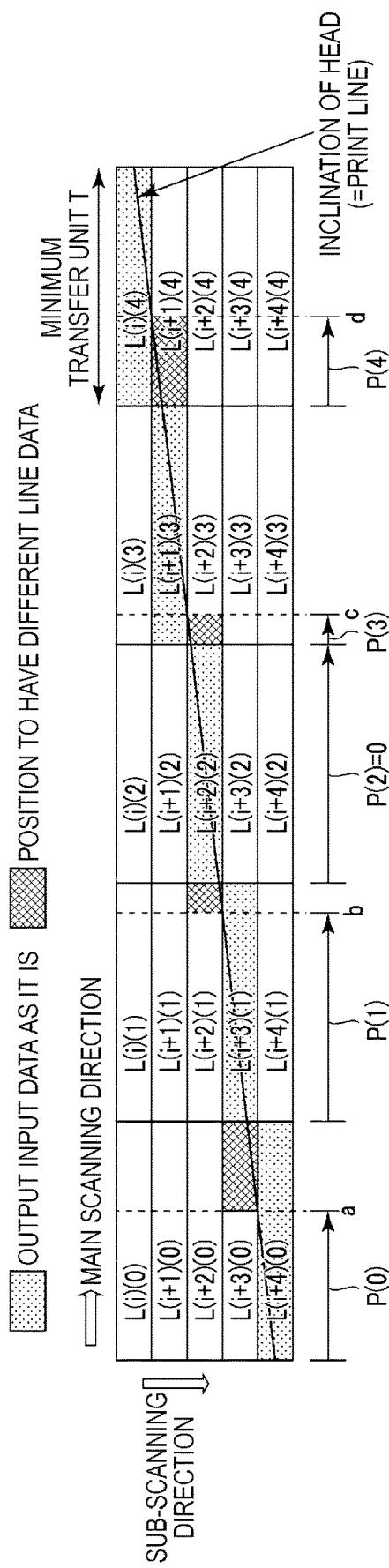
FIG. 3 is a diagram illustrating an example of a print head inclination and inclination correction.

FIG. 3 is a diagram illustrating an example of the inclination of the print head and the inclination correction according to the embodiment.

As illustrated in FIG. 3, the image data corresponding to the document image is constituted of a plurality of image lines corresponding to the main scanning direction, and each of the image lines is constituted of a predetermined number of divided image lines. Each image line has the same data length (data size), and each divided image line also has the same data length (data size).

For example, the image line L(i) of the first row is constituted of the divided image line L(i) (0) of the first column, L(i) (1) of the second column, and L(i) (2) of the third column, L(i) (3) in the fourth column and L(i) (4) in the fifth column. Similarly, the image line L(i+1) of the second row, the image line L(i+2) of the third row, the image line L(i+3) of the fourth row, and the image line L(i+4) of the fifth row are also constituted of a predetermined number of divided image lines.

Here, an example of image data transfer by the image data transfer control unit 114 that transfers image data in predetermined units will be described. The page memory control unit 1141 reads a plurality of line images constituting the image data stored in the page memory 113, and the output data selection unit 1147 outputs the read plurality of image lines to the print head 116. For example, the page memory control unit 1141 reads one image line a plurality of times in units of divided image lines. That is, the page memory control unit 1141 performs burst transfer for an arbitrary number of pixels from the start position of one image line. When one pixel constituting the image data corresponds to one bit, the page memory control unit 1141 reads T pixels (the number of pixels of one divided image line, 256 bits) in one burst transfer, and the output data selection unit 1147 outputs the read T pixels to the print head 116. That is, the minimum unit of data transfer by the image data transfer control unit 114 is T pixels.

Next, an example of the inclination correction in the image data transfer by the image data transfer control unit 114 will be described.

As described above, the control unit 101 detects the inclination (the amount of inclination) of the print head 116 with respect to the regular mounting position from the result of the test pattern, and generates inclination correction data corresponding to the inclination. The correction control unit 1144 outputs a selection control signal for selecting a divided image line group constituted of a predetermined number of divided image lines corresponding to each print line based on the inclination correction data in order to print an image formed by a plurality of print lines.

An example will be described with reference to FIG. 3. A predetermined divided image line group corresponding to the inclination of the print head 16 is constituted of a divided image line L(i+4) (0), a divided image line L(i+3) (1), a divided image line L (i+2) (2), a divided image line L (i+1) (3), and a divided image line L(i) (4).

Alternatively, in consideration of a shift amount corresponding to the inclination, a predetermined divided image line group corresponding to the inclination of the print head 16 is constituted of the divided image line L(i+4) (0), the divided image line L(i+3) (1), the divided image line L(i+2) (2), a divided image line L(i+2) (3), and a divided image line L(i+1) (4).

The correction control unit 1144 outputs, based on the inclination correction data, a selection control signal for selecting a divided image line group constituted of the divided image line L(i+4) (0), the divided image line L(i+3) (1), the divided image line L(i+2) (2), the divided image line L(i+1) (3) and the divided image line L(i) (4) corresponding to the predetermined print line. Based on the selection control signal, the output data selection unit 1147 selects a divided image line group constituted of the divided image line L(i+4) (0), the divided image line L(i+3) (1), the divided image line L(i+2) (2), and the divided image line L(i+1) (3) and the divided image line L(i) (4) and outputs the divided image line group to the print head 116.

Alternatively, based on the inclination correction data, the correction control unit 1144 outputs a selection control signal for selecting a divided image line group constituted of the divided image line L(i+4) (0), the divided image line L(i+3) (1), and the divided image line L(i+2) (2), the divided image line L(i+2) (3) and the divided image line L(i+1) (4) corresponding to the predetermined print line. Based on the selection control signal, the output data selection unit 1147 selects a divided image line group constituted of the divided image line L(i+4) (0), the divided image line L(i+3) (1), the divided image line L(i+2) (2), the divided image line L(i+2) (3) and the divided image line L(i+1) (4), and outputs the divided image line group to the print head 116.

By these inclination corrections, an image formed by a print line corresponding to the inclination of the print head 116 can be printed, and the influence of a shift in the sub-scanning direction is suppressed.

Next, an example of line correction (replacement) in image data transfer by the image data transfer control unit 114 will be described. Here, the latter case, i.e., an example of the line correction (replacement) will be described on the case that the divided image line group constituted of the divided image line L(i+4) (0), the divided image line L(i+3) (1), the divided image line L(i+2) (2), the divided image line L(i+2) (3) and the divided image line L(i+1) (4) is selected.

As described above, the control unit 101 generates correction position data indicating a correction position included in a divided image line constituting image data based on the inclination correction data. The correction control unit 1144 specifies the correction target image data stored in the line correction data memory 1146 based on the correction position data, and the output data selection unit 1147 selects and outputs the specified correction target image data.

An example will be described with reference to FIG. 3. When focusing on the divided image line L(i+4) (0) corresponding to a predetermined print line, the control unit 101 determines a position at which the predetermined print line deviates from the divided image line L (i+4) (0) as a correction position a (the a-th pixel from the beginning of the divided image line) based on the inclination correction data, and generates correction position data a' indicating the correction position a of the divided image line L(i+n) (0). The control unit 101 sets the correction position a in the first data transfer of the image line (the first divided image line) to a set value P(0) and generates the correction position data a'. The correction position a indicates a position common to the divided image lines L(i+n) (0) in the sub-scanning direction orthogonal to the main scanning direction. n represents an integer of 0 or more.

When focusing on the divided image line L (i+3) (1) corresponding to the predetermined print line, the control unit 101 determines a position at which the predetermined print line deviates from the divided image line L (i+3) (1) as a correction position b (the b-th pixel from the beginning of the divided image line) based on the inclination correction data, and generates correction position data b' indicating the correction position b of the divided image line L(i+n) (1). The control unit 101 sets the correction position b in the second data transfer of the image line (the second divided image line) to a set value P(1) and generates the correction position data b'. The correction position b indicates a position common to the divided image lines L(i+n) (1) in the sub-scanning direction.

When focusing on the divided image line L (i+2) (2) corresponding to the predetermined print line, the control unit 101 determines a position at which the predetermined print line deviates from the divided image line L (i+2) (2) as a correction position (no correction) based on the inclination correction data, and generates correction position data (no correction) indicating the correction position (no correction) of the divided image line L(i+n) (2). The control unit 101 sets the correction position 0 in the third data transfer of the image line (the third divided image line) to a set value P(2) and generates the correction position data (0).

When focusing on the divided image line L (i+2) (3) corresponding to the predetermined print line, the control unit 101 determines a position at which the predetermined print line deviates from the divided image line L (i+2) (3) as a correction position c (the c-th pixel from the beginning of the divided image line) based on the inclination correction data, and generates correction position data c' indicating the correction position c of the divided image line L(i+n) (3). The control unit 101 sets the correction position c in the fourth data transfer of the image line (the fourth divided image line) to a set value P(3) and generates the correction position data c'. The correction position c indicates a position common to the divided image lines L(i+n) (3) in the sub-scanning direction.

When focusing on the divided image line L (i+1) (4) corresponding to the predetermined print line, the control unit 101 determines a position at which the predetermined print line deviates from the divided image line L(i+1) (4) as a correction position d (the d-th pixel from the beginning of the divided image line) based on the inclination correction data, and generates correction position data d' indicating the correction position d of the divided image line L(i+n) (4). The control unit 101 sets the correction position d in the fifth data transfer of the image line (the fifth divided image line) to a set value P(4) and generates the correction position data d'. The correction position d indicates a position common to the divided image lines L(i+n) (4) in the sub-scanning direction.

The correction control unit 1144 specifies first correction target image data included in a first divided image line group and second correction target image data included in a second divided image line group based on the correction position data, and outputs the second divided image line group including the first correction target image data instead of the second correction target image data to the print head 116.

Figure 4:
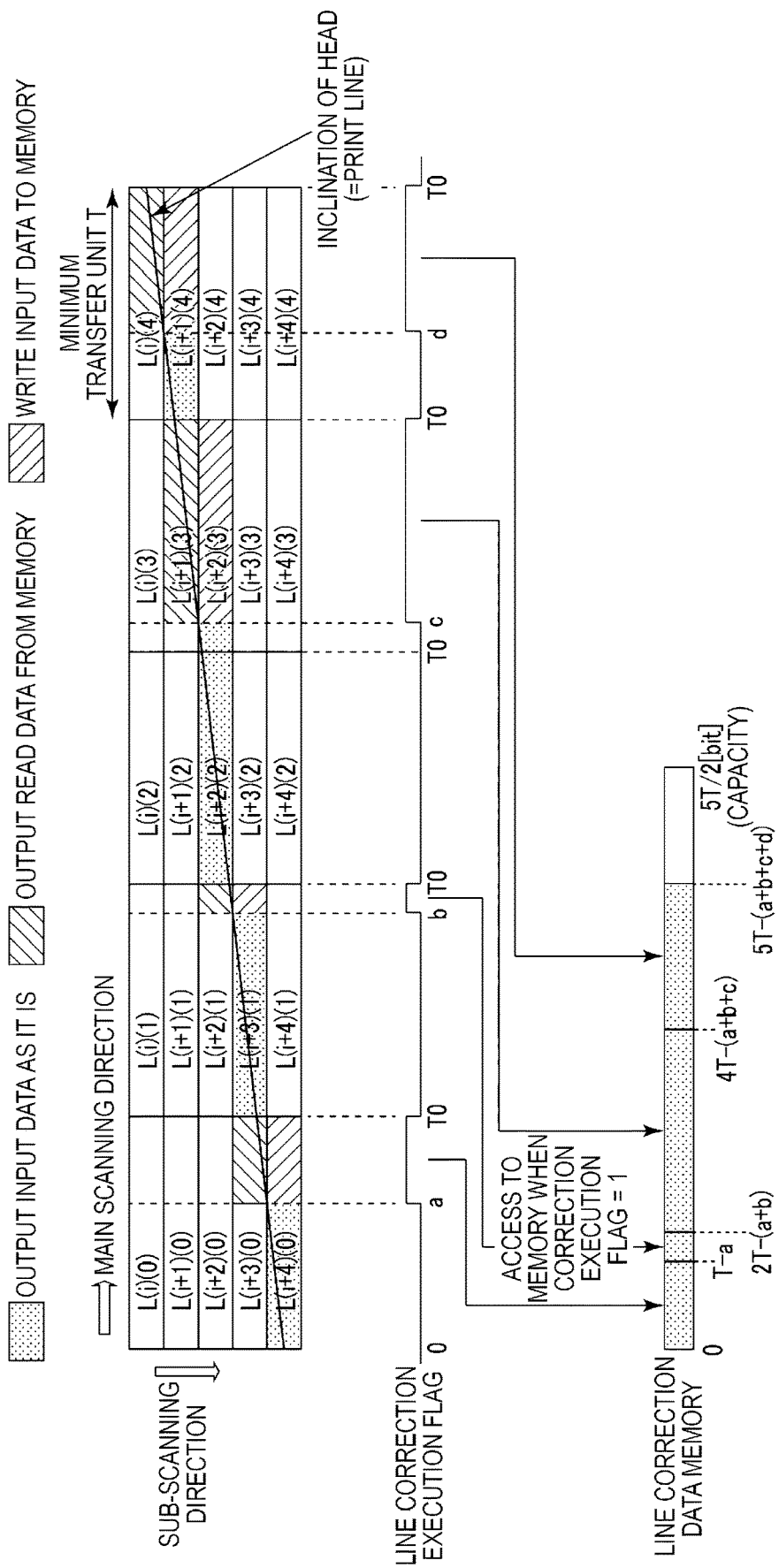
FIG. 4 is a diagram illustrating an example of image data transfer by the image data transfer controller.

FIG. 4 is a diagram illustrating an example of image data transfer by the image data transfer control unit according to the embodiment.

For example, the first divided image line group is constituted of the divided image line L(i+3) (0), the divided image line L(i+2) (1), the divided image line L(i+1) (2), the divided image line L(i+1) (3) and the divided image line L(i) (4). The second divided image line group is constituted of the divided image line L(i+4) (0), the divided image line L(i+3) (1), the divided image line L(i+2) (2), the divided image line L(i+2) (3) and the divided image line L(i+1) (4).

Based on the correction position data a', the correction control unit 1144 specifies first correction target image data a1 from the correction position a to the end of the divided image line L(i+3) (0) included in the first divided image line group, and second correction target image data a2 from the correction position a to the end of the divided image line L(i+4) (0) included in the second divided image line group. Similarly, correction target image data included in other divided image lines L(i+n) (0) is also specified.

Based on this specification, the line correction memory control unit 1145 outputs the first correction target image data a1 stored in the line correction data memory 1146, and the line correction data memory 1146 stores the second correction target image data a2 instead of the first correction target image data a1. To supplement, the line correction data memory 1146 can delete or overwrite the first correction target image data a1 by outputting the first correction target image data a1, and thus, it is possible to store the second correction target image data a2 instead of the first correction target image data a1 without excessively increasing the storage capacity. For example, the storage capacity may be increased to an amount that is less than a first threshold amount.

Accordingly, the output data selection unit 1147 outputs the second divided image line group including the first correction target image data a1 instead of the second correction target image data a2 (that is, the divided image line L(i+4) (0) including the first correction target image data a1 instead of the second correction target image data a2) to the print head 116.

Further, based on the correction position data b', the correction control unit 1144 specifies first correction target image data b1 from the correction position b to the end of the divided image line L(i+2) (1) included in the first divided image line group, and second correction target image data b2 from the correction position b to the end of the divided image line L (i+3) (1) included in the second divided image line group. Similarly, correction target image data included in other divided image lines L(i+n) (1) is also specified.

Based on this specification, the line correction memory control unit 1145 outputs the first correction target image data b1 stored in the line correction data memory 1146, and the line correction data memory 1146 stores the second correction target image data b2 instead of the first correction target image data b1. Accordingly, the output data selection unit 1147 outputs the second divided image line group including the first correction target image data b1 instead of the second correction target image data b2 (that is, the divided image line L(i+3) (1) including the first correction target image data b1 instead of the second correction target image data b2) to the print head 116.

Further, based on the correction position data (no correction), the correction control unit 1144 specifies that there is no correction target image data in the divided image line L (i+1) (2) included in the first divided image line group, and that there is no correction target image data in the divided image line L(i+2) (2) included in the second divided image line group. Similarly, it is specified that there is no correction target image data in other divided image lines L(i+n) (2).

The line correction memory control unit 1145 does not output the data stored in the line correction data memory 1146 based on this specification.

As a result, the output data selection unit 1147 outputs the second divided image line group including the divided image line L(i+2) (2) to the print head 116.

Further, based on the correction position data c', the correction control unit 1144 specifies first correction target image data c1 from the correction position c to the end of the divided image line L(i+1) (3) included in the first divided image line group, and second correction target image data c2 from the correction position c to the end of the divided image line L (i+2) (3) included in the second divided image line group. Similarly, correction target image data included in other divided image lines L(i+n) (3) is also specified.

Based on this specification, the line correction memory control unit 1145 outputs the first correction target image data c1 stored in the line correction data memory 1146, and the line correction data memory 1146 stores the second correction target image data c2 instead of the first correction target image data c1.

As a result, the output data selection unit 1147 outputs the second divided image line group including the first correction target image data c1 instead of the second correction target image data c2 (that is, the divided image line L(i+2) (3) including the first correction target image data c1 instead of the second correction target image data c2) to the print head 116.

Further, based on the correction position data d', the correction control unit 1144 specifies first correction target image data d1 from the correction position d to the end of the divided image line L(i) (4) included in the first divided image line group, and second correction target image data d2 from the correction position d to the end of the divided image line L(i+1) (4) included in the second divided image line group. Similarly, correction target image data included in other divided image lines L(i+n) (4) is also specified.

Based on this specification, the line correction memory control unit 1145 outputs the first correction target image data d1 stored in the line correction data memory 1146, and the line correction data memory 1146 stores the second correction target image data d2 instead of the first correction target image data d1.

As a result, the output data selection unit 1147 outputs the second divided image line group including the first correction target image data d1 instead of the second correction target image data d2 (that is, the divided image line L(i+1) (4) including the first correction target image data d1 instead of the second correction target image data d2) to the print head 116.

Here, the relationship between the line correction execution flag illustrated in FIG. 4 and the data to be stored in the line correction data memory will be described.

When the image data transfer control unit 114 transfers image data in predetermined units, the page memory control unit 1141 reads image data in predetermined units, and the pixel position calculation unit 1142 calculates a pixel position. Here, the minimum transfer unit of the image data is assumed to be one divided image line. In some embodiments, the minimum transfer unit may be greater than one divided image line, however.

The pixel position calculation unit 1142 calculates the number of pixels of the image data read by the data transfer and outputs the pixel position data. The correction control unit 1144 determines whether to execute the line correction process based on the correction position data stored in the correction data memory 1143 and the pixel position data output from the pixel position calculation unit 1142.

Until the pixel position reaches the line correction position data P, the correction control unit 1144 determines not to perform line correction and outputs a correction non-execution flag (flag 0). Based on the correction non-execution flag, the output data selection unit 1147 outputs the transferred image data to the print head 116 as it is. After the pixel position reaches the line correction position data P, the correction control unit 1144 determines to perform line correction and outputs a correction execution flag (flag 1). When one data transfer is completed, the correction execution flag is changed to the correction non-execution flag.

The line correction memory control unit 1145 reads the data (correction target image data one line before the current transfer line) stored in the line correction data memory 1146 based on the correction execution flag, and the output data selection unit 1147 replaces the data (correction target data of the current transfer line) sent from the page memory control unit 1141 and sends the read data (correction target image data one line before the current transfer line) to the print head 116. At the same time, the line correction memory control unit 1145 replaces the data read from the line correction data memory 1145 (correction target image data one line before the current transfer line) and overwrites the input image data (correction target image data of the current transfer line) to the line correction data memory 1145. This process is performed on the image data of the remaining transfer number (T-P) until one data transfer is completed.

Figure 5:
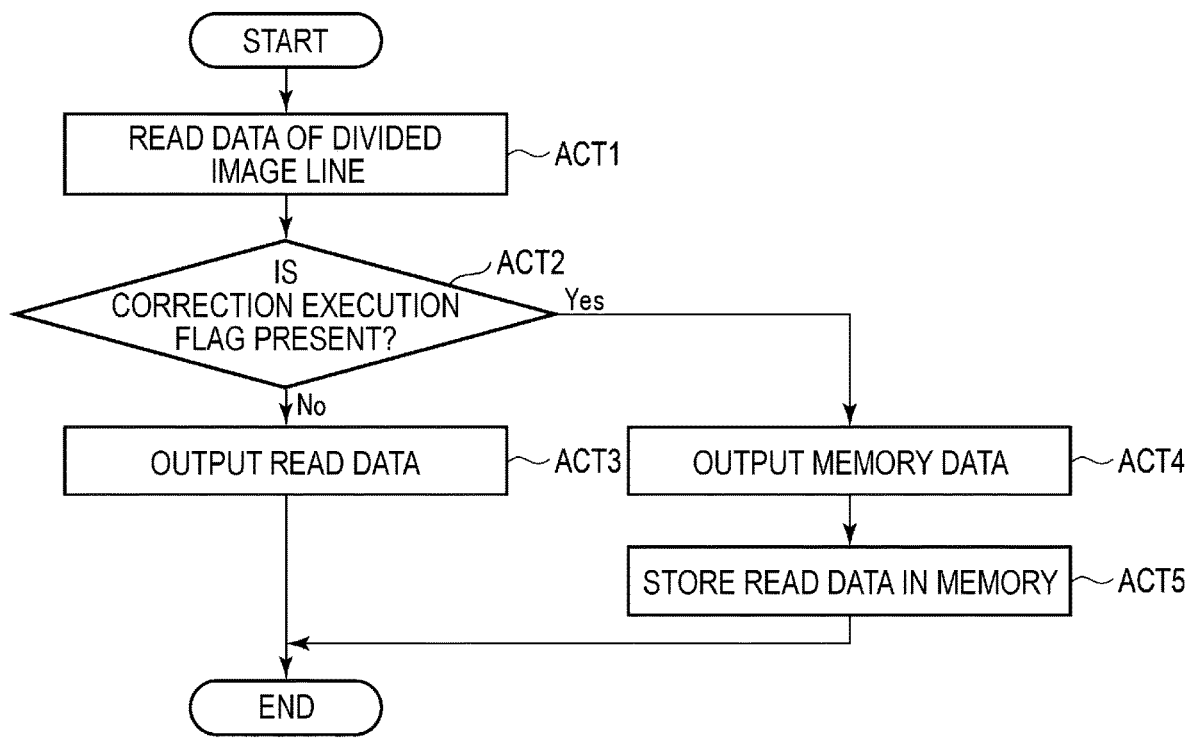
FIG. 5 is a flowchart illustrating an example of image data transfer by the image data transfer control unit.

An example will be described with reference to FIGS. 4 and 5. FIG. 5 is a flowchart illustrating an example of the image data transfer control according to the embodiment.

The page memory control unit 1141 executes the first data transfer of the divided image data included in one image line, that is, the data transfer of the divided image data in the first column. That is, the page memory control unit 1141 reads the image data of the divided image line L(i+4) (0) from the line start position to the T-th pixel (in the case of 1 bit/pixel) (ACT1). The correction control unit 1144 determines whether to execute the line correction process based on the correction position data stored in the correction data memory 1143 and the pixel position data output from the pixel position calculation unit 1142, and outputs a correction execution flag or a correction non-execution flag.

The output data selection unit 1147 outputs the read image data based on the correction non-execution flag (ACT2, NO) (ACT3). Further, the output data selection unit 1147 outputs the correction target image data of one line before the image data output from the line correction data memory 1146 instead of the correction target image data included in the image data read based on the correction execution flag (ACT2, YES) (ACT4). That is, in the section from the read start position to the correction position a set to P(0), the output data selection unit 1147 outputs the image data of the divided image line L(i+4) (0) to the print head 116 (ACT3). In the section from the correction position a to the read end position, the output data selection unit 1147 outputs the image data (correction target data) of the previous divided image line L(i+3) (0) to the print head 116 (ACT4). Further, based on the correction execution flag, the line correction memory control unit 1145 stores the image data of the divided image line L(i+4) (0) in the line correction data memory 1146 in the section from the correction position a to the read end position based on the correction execution flag (ACT5).

In the second data transfer, that is, in the data transfer of the divided image data in the second column, the page memory control unit 1141 reads the image data of the divided image line L(i+3) (1) from the (T+1)-th pixel to the 2T-th pixel (ACT1). Based on the correction non-execution flag, the output data selection unit 1147 outputs the image data of the divided image line L(i+3) (1) to the print head 116 in the section from the read start position to the correction position b set to P(1) (ACT2, NO) (ACT3). In addition, based on the correction execution flag, the output data selection unit 1147 outputs the image data (correction target data) of the previous divided image line L(i+2) (1) to the print head 116 in the section from the correction position b to the read end position (ACT2, YES) (ACT4). Further, based on the correction execution flag, the line correction memory control unit 1145 stores the image data of the divided image line L(i+3) (1) in the line correction data memory 1146 in the section from the correction position b to the read end position (ACT5).

In the third data transfer, that is, in the data transfer of the divided image data in the third column, the page memory control unit 1141 reads the image data of the divided image line L(i+2) (2) from the (2T+1)-th pixel to the 3T-th pixel (ACT1). In the example of FIG. 4, since the correction position 0 is set in the divided image data of the third column, the output data selection unit 1147 outputs the image data of divided image line L(i+2) (2) to the print head 116 in the section from the read start position to the read end position based on the correction non-execution flag (ACT2, YES) (ACT3).

In the fourth data transfer, that is, in the data transfer of the divided image data in the fourth column, the page memory control unit 1141 reads the image data of the divided image line L(i+2) (3) from the (3T+1)-th pixel to the 4T-th pixel (ACT1). The output data selection unit 1147 outputs the image data of the divided image line L(i+2) (3) to the print head 116 in the section from the read start position to the correction position c set to P(3) based on the correction non-execution flag (ACT2, NO) (ACT3). In addition, based on the correction execution flag, the output data selection unit 1147 outputs the image data (correction target data) of the previous divided image line L(i+1) (3) to the print head 116 in the section from the correction position c to the read end position (ACT2, YES) (ACT4). Further, based on the correction execution flag, the line correction memory control unit 1145 stores the image data of the divided image lines L(i+2) (3) in the line correction data memory 1146 in the section from the correction position c to the read end position (ACT5).

In the fifth data transfer, that is, in the data transfer of the fifth column of the divided image data, the page memory control unit 1141 reads the image data of the divided image line L(i+1) (4) from the (4T+1)-th pixel to the 5T-th pixel (ACT1). Based on the correction non-execution flag, the output data selection unit 1147 outputs the image data of the divided image line L(i+1) (4) to the print head 116 in the section from the read start position to the correction position d set to P(4) (ACT2, NO) (ACT3). The output data selection unit 1147 outputs the image data (correction target data) of the previous divided image line L(i) (4) to the print head 116 in the section from the correction position d to the read end position (ACT2, YES) (ACT4). Further, based on the correction execution flag, the line correction memory control unit 1145 stores the image data of the divided image line L(i+1) (4) in the line correction data memory 1146 in the section from the correction position d to the read end position (ACT5).

As described above, in the first, second, fourth, and fifth columns, by constituting one divided image line from the image data of two adjacent lines, the influence of the inclination of the print head can be suppressed with high accuracy. In addition, the line correction memory control unit 1145 reads out image data from the line correction data memory 1146 based on the correction execution flag and writes the image data into the line correction data memory 1146. Thus, since one divided image line can be made up of the image data of two adjacent lines as described above, it is not necessary to excessively increase the storage capacity of the line correction data memory 1146.

In other words, at the time of image data transfer, the correction position data corresponding to the number of pixels transferred from the line start position is used, and in one data transfer, the data from the first pixel of the line start position to the shift occurrence position (correction position), and the data from the shift occurrence position to the final data (256-th pixel) are separately handled. The former is sent to the print head as it is as print data, the latter is stored as the next line data, and the stored data is output with a delay of one line when the next line data is output. By repeating this process, it is possible to correct the shift in the sub-scanning direction at any position within one transfer (for example, 256 pixels) without lowering the data transfer efficiency.

According to the present embodiment described above, it is possible to provide an image data transfer control device and an image data transfer control method capable of realizing a highly precise inclination correction while securing throughput.

For example, the memory capacity can be reduced as compared with the case where image data for a plurality of lines is read into the memory and the inclination correction processing is executed. Further, the data transfer efficiency can be increased as compared with the case where the image data of the line of the necessary portion is read and the inclination correction processing is executed. According to the present embodiment, it is possible to solve both disadvantages that when the number of data transfers per one time (the number of pixels) is reduced, the accuracy of inclination correction can be increased whereas the transfer efficiency deteriorates, and that conversely, when the number of data transfers per one time (the number of pixels) is increased, the transfer efficiency can be improved whereas the accuracy of inclination correction deteriorates.

While certain embodiments have been described, these embodiments have been presented by way of example only, and are not intended to limit the scope of the inventions. Indeed, the novel apparatus and methods described herein may be embodied in a variety of other forms. Furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image data transfer control device comprising:
   a first memory configured to store a portion of a first divided line of a plurality of first divided image lines that are included in a first image line; and
   a processor configured to:
   acquire a second divided line of a plurality of second divided image lines that are included in a second image line;
   output, to a print head, a corrected divided image line including the portion of the first divided image line and a portion of the second divided image line; and replace, in the first memory, the portion of the first divided image line with a remaining portion of the second divided image line.

2. The device according to claim 1, wherein the print head is configured to print an image based on image data in units of divided image lines, each divided image line being constituted of a plurality of bits.

3. The device according to claim 1, further comprising:
a second memory configured to store:
inclination correction data corresponding to an inclination of the print head; and
correction position data indicating a correction position included in at least one divided image line among a predetermined number of divided image lines.

4. The device according to claim 3, wherein the processed is configured to determine, based on the correction position data, the corrected divided image line.

5. The device according to claim 4, wherein the processor is configured to specify the portion of the first divided image line as data from the correction position to an end of the first divided image line and the portion of the second divided image line as data from a beginning of the second divided image line to the correction position, respectively.

6. The device according to claim 1, wherein the plurality of first divided image lines are arranged along a main scanning direction, and the plurality of second divided image lines are arranged along the main scanning direction.

7. The device according to claim 1, wherein the first image line and the second image line are arranged along a sub-scanning direction orthogonal to the main scanning direction.

8. An image data transfer control method, comprising:
storing, in a first memory, a portion of one of a plurality of first divided image lines that are included in a first image line;
acquiring one of a plurality of second divided image lines that are included in a second image line;
outputting, to a print head, a corrected divided image line including the portion of the first divided image line and a portion of the second divided image line; and
replacing, in the first memory, the portion of the first divided image line with a remaining portion of the second divided image line.

9. The method according to claim 8, wherein the print head is configured to print an image based on image data in units of divided image lines, each divided image line being constituted of a plurality of bits.

10. The method according to claim 8, further comprising:
storing, in a second memory, inclination correction data corresponding to an inclination of the print head, and correction position data indicating a correction position included in at least one divided image line among a predetermined number of divided image lines.

11. The method according to claim 10, further comprising:
determining, based on the correction position data, the corrected divided image line.

12. The method according to claim 11, further comprising:
specifying the portion of the first divided image line as data from the correction position to an end of the first divided image line and the portion of the second divided image line as data from a beginning of the second divided image line to the correction position, respectively.

13. The method according to claim 8, wherein the plurality of first divided image lines are arranged along a main scanning direction, and the plurality of second divided image lines are arranged along the main scanning direction.

14. The method according to claim 8, wherein the first image line and the second image line are arranged along a sub-scanning direction orthogonal to the main scanning direction.

15. A non-transitory computer-readable medium configured to store instructions thereon, which instructions, when executed by a processor, cause a controller to perform operations comprising:
storing, in a first memory, a portion of one of a plurality of first divided image lines that are included in a first image line;
acquiring one of a plurality of second divided image lines that are included in a second image line;
outputting, to a print head, a corrected divided image line including the portion of the first divided image line and a portion of the second divided image line; and
replacing, in the first memory, the portion of the first divided image line with a remaining portion of the second divided image line.

16. The non-transitory computer-readable medium according to claim 15, wherein the operations further comprise:
storing, in a second memory, inclination correction data corresponding to an inclination of the print head, and correction position data indicating a correction position included in at least one divided image line among a predetermined number of divided image lines.

17. The non-transitory computer-readable medium according to claim 15, wherein the operations further comprise:
determining, based on the correction position data, the corrected divided image line.

18. The non-transitory computer-readable medium according to claim 17, wherein the operations further comprise:
specifying the portion of the first divided image line as data from the correction position to an end of the first divided image line and the portion of the second divided image line as data from a beginning of the second divided image line to the correction position, respectively.

19. The non-transitory computer-readable medium according to claim 15, wherein the plurality of first divided image lines are arranged along a main scanning direction, and the plurality of second divided image lines are arranged along the main scanning direction.

20. The non-transitory computer-readable medium according to claim 15, wherein the first image line and the second image line are arranged along a sub-scanning direction orthogonal to the main scanning direction.

* * * * *